US011210692B2

(12) United States Patent
Keller et al.

(10) Patent No.: US 11,210,692 B2
(45) Date of Patent: Dec. 28, 2021

(54) SYSTEMS AND METHODS FOR DELIVERING DYNAMIC OFFERS TO INCENT USER BEHAVIOR

(71) Applicant: eBay Inc., San Jose, CA (US)

(72) Inventors: Arik Keller, Newburyport, MA (US); Dane Howard, Los Gatos, CA (US); Michael Lenahan, Moraga, CA (US); Ben Mitchell, Oakland, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/705,576

(22) Filed: Dec. 6, 2019

(65) Prior Publication Data

US 2020/0111116 A1    Apr. 9, 2020

Related U.S. Application Data

(63) Continuation of application No. 13/340,970, filed on Dec. 30, 2011, now Pat. No. 10,528,966.

(51) Int. Cl.
*G06Q 30/02* (2012.01)
*G06Q 50/00* (2012.01)

(52) U.S. Cl.
CPC ..... *G06Q 30/0224* (2013.01); *G06Q 30/0235* (2013.01); *G06Q 30/0261* (2013.01); *G06Q 50/01* (2013.01)

(58) Field of Classification Search
CPC ........... G06Q 30/0224; G06Q 30/0235; G06Q 30/0261; G06Q 30/02; G06Q 30/0207; G06Q 30/0211; G06Q 50/01
See application file for complete search history.

(56) References Cited

U.S. PATENT DOCUMENTS

| | | | |
|---|---|---|---|
| 5,649,114 A | 7/1997 | Deaton et al. |
| 5,724,660 A | 3/1998 | Kauser et al. |
| 5,732,354 A | 3/1998 | MacDonald |
| 5,848,373 A | 12/1998 | DeLorme et al. |
| 5,890,068 A | 3/1999 | Fattouche et al. |
| 5,905,246 A | 5/1999 | Fajkowski |

(Continued)

OTHER PUBLICATIONS

"Halfbakery: Buddy Locator", Retrieved from the Internet:— URL<http://www.halfbakery.com/idea/Buddy_20Locator#1055455737>, Jun. 11, 2003, 3 pages.

(Continued)

*Primary Examiner* — Matthew S Gart
*Assistant Examiner* — Stephen S Swartz
(74) *Attorney, Agent, or Firm* — Shook, Hardy & Bacon LLC

(57) ABSTRACT

Systems and methods to deliver dynamic context sensitive offers to intent user behavior are discussed. For example, a method to deliver a dynamic context sensitive oar can include operations for generating a dynamic offer, delivering the dynamic offer, receiving data associated with a user, updating a context input with data associated with the user, and adjusting the value of the dynamic offer. Generating the dynamic offer includes associating a rule for manipulating the value of the dynamic offer based on a context input. Updating the context input of the rule includes extracting context information from the data associated with the user. Adjusting the value of the dynamic offer can be based on reevaluation of the rule with the updated context input.

20 Claims, 8 Drawing Sheets

(56) References Cited

U.S. PATENT DOCUMENTS

| | | | |
|---|---|---|---|
| 5,948,040 A * | 9/1999 | DeLorme | G01C 21/36 340/990 |
| 6,069,570 A | 5/2000 | Herring | |
| 6,091,956 A | 7/2000 | Hollenberg | |
| 6,097,958 A | 8/2000 | Bergen | |
| 6,157,841 A | 12/2000 | Bolduc et al. | |
| 6,167,274 A | 12/2000 | Smith | |
| 6,198,927 B1 | 3/2001 | Wright et al. | |
| 6,204,812 B1 | 3/2001 | Fattouche | |
| 6,208,297 B1 | 3/2001 | Fattouche et al. | |
| 6,208,857 B1 | 3/2001 | Agre et al. | |
| 6,243,588 B1 | 6/2001 | Koorapaty et al. | |
| 6,246,861 B1 | 6/2001 | Messier et al. | |
| 6,246,882 B1 | 6/2001 | Lachance | |
| 6,259,381 B1 | 7/2001 | Small | |
| 6,259,923 B1 | 7/2001 | Lim et al. | |
| 6,266,014 B1 | 7/2001 | Fattouche et al. | |
| 6,314,365 B1 | 11/2001 | Smith | |
| 6,317,684 B1 | 11/2001 | Roeseler et al. | |
| 6,330,452 B1 | 12/2001 | Fattouche et al. | |
| 6,341,255 B1 | 1/2002 | Lapidot | |
| 6,347,230 B2 | 2/2002 | Koshima et al. | |
| 6,356,543 B2 | 3/2002 | Hall et al. | |
| 6,404,388 B1 | 6/2002 | Sollenberger et al. | |
| 6,424,840 B1 | 7/2002 | Fitch et al. | |
| 6,442,529 B1 | 8/2002 | Krishan et al. | |
| 6,456,852 B2 | 9/2002 | Bar et al. | |
| 6,477,363 B1 | 11/2002 | Ayoub et al. | |
| 6,496,857 B1 | 12/2002 | Dustin et al. | |
| 6,519,463 B2 | 2/2003 | Tendler | |
| 6,553,313 B1 | 4/2003 | Froeberg | |
| 6,563,459 B2 | 5/2003 | Takenaga | |
| 6,577,946 B2 | 6/2003 | Myr | |
| 6,580,914 B1 | 6/2003 | Smith | |
| 6,590,533 B2 | 7/2003 | Sollenberger et al. | |
| 6,618,593 B1 | 9/2003 | Drutman et al. | |
| 6,625,457 B1 | 9/2003 | Raith | |
| 6,690,322 B2 | 2/2004 | Shamoto et al. | |
| 6,714,797 B1 | 3/2004 | Rautila | |
| 6,732,080 B1 | 5/2004 | Blants | |
| 6,807,479 B2 | 10/2004 | Watanabe et al. | |
| 6,862,575 B1 | 3/2005 | Anttila et al. | |
| 7,006,983 B1 | 2/2006 | Packes, Jr. et al. | |
| 7,092,702 B2 | 8/2006 | Cronin et al. | |
| 7,103,368 B2 | 9/2006 | Teshima | |
| 7,130,622 B2 | 10/2006 | Vanska et al. | |
| 7,138,913 B2 | 11/2006 | Mackenzie et al. | |
| 7,142,858 B2 | 11/2006 | Aoki et al. | |
| 7,164,986 B2 | 1/2007 | Humphries et al. | |
| 7,199,815 B2 | 4/2007 | Aoyama | |
| 7,233,913 B2 | 6/2007 | Scroggie et al. | |
| 7,254,388 B2 | 8/2007 | Nam et al. | |
| 7,273,172 B2 | 9/2007 | Olse et al. | |
| 7,367,500 B2 | 5/2008 | Fajkowski | |
| 7,385,499 B2 | 6/2008 | Horton et al. | |
| 7,389,919 B2 | 6/2008 | Walker et al. | |
| 7,502,133 B2 | 3/2009 | Fukunaga et al. | |
| 7,593,871 B1 | 9/2009 | Mesaros | |
| 7,657,436 B2 | 2/2010 | Elmore et al. | |
| 7,669,759 B1 | 3/2010 | Zettner | |
| 7,747,259 B2 | 6/2010 | Pande et al. | |
| 7,848,765 B2 | 12/2010 | Phillips et al. | |
| 7,909,326 B2 | 3/2011 | Walker et al. | |
| 8,041,604 B1 | 10/2011 | Glaser | |
| 8,099,109 B2 | 1/2012 | Altman et al. | |
| 8,249,884 B2 | 8/2012 | Turner et al. | |
| 8,326,315 B2 | 12/2012 | Phillips et al. | |
| 8,355,948 B2 | 1/2013 | Mason | |
| 8,371,502 B1 | 2/2013 | Galit et al. | |
| 8,423,408 B1 | 4/2013 | Barnes et al. | |
| 8,533,039 B1 | 9/2013 | Winslade et al. | |
| 8,566,197 B2 * | 10/2013 | Satyavolu | G06Q 30/0215 705/35 |
| 8,660,892 B2 | 2/2014 | Subhan | |
| 8,732,019 B2 | 5/2014 | Brown et al. | |
| 8,862,150 B2 | 10/2014 | Phillips et al. | |
| 8,909,248 B2 | 12/2014 | Phillips et al. | |
| 9,792,616 B2 * | 10/2017 | Wessels | G06Q 30/0224 |
| 10,528,966 B2 | 1/2020 | Keller et al. | |
| 2001/0014868 A1 | 8/2001 | Herz et al. | |
| 2001/0055976 A1 | 12/2001 | Crouch et al. | |
| 2002/0082941 A1 | 6/2002 | Bird | |
| 2002/0143930 A1 | 10/2002 | Babu et al. | |
| 2002/0145984 A1 | 10/2002 | Babu et al. | |
| 2002/0155844 A1 | 10/2002 | Rankin et al. | |
| 2002/0185827 A1 | 12/2002 | Caponetto et al. | |
| 2002/0188527 A1 | 12/2002 | Dillard et al. | |
| 2003/0046158 A1 | 3/2003 | Kratky | |
| 2003/0055726 A1 | 3/2003 | Sohya et al. | |
| 2003/0063128 A1 | 4/2003 | Salmimaa et al. | |
| 2003/0098892 A1 | 5/2003 | Hiipakka | |
| 2003/0125043 A1 | 7/2003 | Silvester | |
| 2003/0126150 A1 | 7/2003 | Chan | |
| 2003/0130787 A1 | 7/2003 | Clapper | |
| 2003/0134645 A1 | 7/2003 | Stern et al. | |
| 2003/0139190 A1 | 7/2003 | Steelberg et al. | |
| 2003/0195044 A1 | 10/2003 | Narita | |
| 2003/0197740 A1 | 10/2003 | Reponen | |
| 2003/0208409 A1 | 11/2003 | Mault | |
| 2003/0216960 A1 | 11/2003 | Postrel | |
| 2003/0220835 A1 | 11/2003 | Barnes, Jr. | |
| 2004/0002359 A1 | 1/2004 | Deas et al. | |
| 2004/0021567 A1 | 2/2004 | Dunn | |
| 2004/0043773 A1 | 3/2004 | Lee et al. | |
| 2004/0142750 A1 | 7/2004 | Glisson et al. | |
| 2004/0192339 A1 | 9/2004 | Wilson et al. | |
| 2004/0192349 A1 | 9/2004 | Reilly | |
| 2004/0203901 A1 | 10/2004 | Wilson et al. | |
| 2004/0203931 A1 | 10/2004 | Karaoguz | |
| 2004/0225560 A1 | 11/2004 | Lewis et al. | |
| 2005/0159883 A1 | 7/2005 | Humphries et al. | |
| 2005/0250516 A1 | 11/2005 | Shim | |
| 2005/0278749 A1 | 12/2005 | Ewert et al. | |
| 2006/0047825 A1 | 3/2006 | Steenstra et al. | |
| 2006/0064346 A1 | 3/2006 | Steenstra et al. | |
| 2006/0099959 A1 | 5/2006 | Staton et al. | |
| 2006/0145837 A1 | 7/2006 | Horton et al. | |
| 2006/0211453 A1 | 9/2006 | Schick | |
| 2006/0224583 A1 | 10/2006 | Fikes et al. | |
| 2006/0236257 A1 | 10/2006 | Othmer et al. | |
| 2006/0270421 A1 | 11/2006 | Phillips et al. | |
| 2007/0024469 A1 | 2/2007 | Chou | |
| 2007/0202844 A1 | 8/2007 | Wilson et al. | |
| 2007/0244633 A1 | 10/2007 | Phillips et al. | |
| 2008/0035725 A1 | 2/2008 | Jambunathan et al. | |
| 2008/0046415 A1 | 2/2008 | Henkin et al. | |
| 2008/0126251 A1 | 5/2008 | Wassingbo | |
| 2008/0248815 A1 * | 10/2008 | Busch | G06Q 30/0255 455/456.5 |
| 2008/0313078 A1 | 12/2008 | Payne et al. | |
| 2009/0061884 A1 * | 3/2009 | Rajan | G06Q 30/02 455/445 |
| 2009/0076911 A1 * | 3/2009 | Vo | G06Q 20/322 705/14.14 |
| 2009/0076912 A1 | 3/2009 | Rajan et al. | |
| 2009/0164304 A1 | 6/2009 | Otto et al. | |
| 2009/0197616 A1 | 8/2009 | Lewis et al. | |
| 2009/0234861 A1 | 9/2009 | Ramer et al. | |
| 2009/0240628 A1 | 9/2009 | Blair et al. | |
| 2009/0276309 A1 | 11/2009 | Otto et al. | |
| 2010/0049609 A1 | 2/2010 | Zhao et al. | |
| 2010/0114683 A1 * | 5/2010 | Wessels | G06Q 30/0207 705/14.13 |
| 2010/0153008 A1 * | 6/2010 | Schwartz | G01C 21/20 701/408 |
| 2011/0029370 A1 * | 2/2011 | Roeding | G06Q 30/0224 705/14.38 |
| 2011/0047075 A1 | 2/2011 | Fourez | |
| 2011/0106605 A1 | 5/2011 | Malik et al. | |
| 2011/0288917 A1 | 11/2011 | Wanek et al. | |
| 2012/0084127 A1 | 4/2012 | Nkrumah | |
| 2012/0126974 A1 | 5/2012 | Phillips et al. | |
| 2012/0129553 A1 | 5/2012 | Phillips et al. | |
| 2012/0143684 A1 | 6/2012 | Park et al. | |

(56) References Cited

U.S. PATENT DOCUMENTS

| | | | |
|---|---|---|---|
| 2012/0166261 | A1 | 6/2012 | Velusamy et al. |
| 2013/0046635 | A1 | 2/2013 | Grigg et al. |
| 2013/0080239 | A1 | 3/2013 | Okerlund |
| 2013/0173377 | A1 | 7/2013 | Keller et al. |
| 2015/0065177 | A1 | 3/2015 | Phillips et al. |
| 2015/0148078 | A1 | 5/2015 | Phillips et al. |
| 2015/0163632 | A1 | 6/2015 | Phillips et al. |

OTHER PUBLICATIONS

"Halfbakery: Mobile Phone Utility", Retrieved from the Internet: URL<http://www.halfbakery.com/idea/mobile_20phone_20utility#1073585857>, Jan. 8, 2004, 2 pages.
"Halfbakery: Mobile Proximity Link", Retrieved from the Internet: URL<http://www.halfbakery.com/idea/Mobile_20Proximity_20Link#1001923289>, Sep. 30, 2001, 2 pages.
"Networks in Motion Named Semi-Finalist for Wireless LBS Challenge", Retrieved from the Internet: <URL: <http://www.usdatanow.com/NetworksInMotion.htm>, Mar. 18, 2004, 2 pages.
"SignalSoft Corporation Awarded Location-Based Services Patent", Retrieved from the Internet: URL<http://www.cellular.co.za/news_2001/04282001-signalsoft-patent.htm>, Apr. 27, 2001, 1 page.
Advisory Action Received for U.S. Appl. No. 13/340,970 dated Jan. 28, 2019, 5 pages.
Advisory Action received for U.S. Appl. No. 13/340,970, dated Feb. 13, 2014, 4 pages.
Applicant Initiated Interview Summary Received For U.S. Appl. No. 13/340,970, dated Aug. 28, 2018, 3 pages.
Applicant Initiated Interview Summary Received For U.S. Appl. No. 13/340,970, dated Nov. 6, 2014, 3 pages.
Final Office Action received for U.S. Appl. No. 13/340,970, dated Apr. 4, 2016, 24 pages.
Final Office Action received for U.S. Appl. No. 13/340,970, dated Feb. 7, 2018, 28 pages.
Final Office Action received for U.S. Appl. No. 13/340,970, dated Feb. 24, 2015, 19 pages.
Final Office Action received for U.S. Appl. No. 13/340,970, dated Mar. 23, 2017, 22 pages.
Final Office Action received for U.S. Appl. No. 13/340,970, dated Nov. 1, 2018, 32 pages.
Final Office Action received for U.S. Appl. No. 13/340,970, dated Sep. 26, 2013, 18 pages.
Non-Final Office Action received for U.S. Appl. No. 13/340,970, dated Apr. 12, 2013, 18 pages.
Non-Final Office Action received for U.S. Appl. No. 13/340,970, dated Aug. 25, 2017, 24 pages.
Non-Final Office Action received for U.S. Appl. No. 13/340,970, dated Aug. 29, 2014, 18 pages.
Non-Final Office Action received for U.S. Appl. No. 13/340,970, dated Oct. 6, 2016, 30 pages.
Non-Final Office Action received for U.S. Appl. No. 13/340,970, dated Sep. 16, 2015, 25 pages.
Non-Final Office Action received for U.S. Appl. No. 13/340,970, dated May 3, 2018, 31 pages.
Non-Final Office action received for U.S. Appl. No. 13/340,970 dated Mar. 21, 2019, 46 pages.
Notice of Allowance Received for U.S. Appl. No. 13/340,970, dated Sep. 3, 2019, 13 pages.
Response to Advisory Action and Final Office Action filed on Feb. 25, 2014, for U.S. Appl. No. 13/340,970, dated Feb. 13, 2014 and dated Sep. 26, 2013, 10 pages.
Response to Advisory Action filed on Feb. 1, 2019, for U.S. Appl. No. 13/340,970, dated Jan. 28, 2019, 17 pages.
Response to Final Office Action filed on Jan. 2, 2019, for U.S. Appl. No. 13/340,970, dated Nov. 1, 2018, 17 pages.
Response to Final Office Action filed on Jan. 27, 2014 for U.S. Appl. No. 13/340,970, dated Sep. 26, 2013, 10 pages.
Response to Final Office Action filed on Jul. 1, 2016 for U.S. Appl. No. 13/340,970, dated Apr. 4, 2016, 16 pages.
Response to Final Office Action filed on Jun. 22, 2017, for U.S. Appl. No. 13/340,970, dated Mar. 23, 2017, 14 pages.
Response to Final Office Action filed on Jun. 24, 2015 for U.S. Appl. No. 13/340,970, dated Feb. 24, 2015, 22 pages.
Response to Final Office Action filed on Mar. 30, 2018, for U.S. Appl. No. 13/340,970, dated Feb. 7, 2018, 14 pages.
Response to Non-Final Office Action filed on Dec. 1, 2014, for U.S. Appl. No. 13/340,970, dated Aug. 29, 2014, 14 pages.
Response to Non-Final Office Action filed on Jan. 6, 2017, for U.S. Appl. No. 13/340,970, dated Oct. 6, 2016, 17 pages.
Response to Non-Final Office Action filed on Jan. 13, 2016, for U.S. Appl. No. 13/340,970, dated Sep. 16, 2015, 18 pages.
Response to Non-Final Office Action filed on Jul. 12, 2013, for U.S. Appl. No. 13/340,970, dated Apr. 12, 2013, 10 pages.
Response to Non-Final Office Action filed on Jul. 22, 2019 for U.S. Appl. No. 13/340,970, dated Mar. 21, 2019, 20 pages.
Response to Non-Final Office Action filed on Nov. 15, 2017, for U.S. Appl. No. 13/340,970, dated Aug. 25, 2017, 20 pages.
Response to Non-Final Office Action filed on Sep. 4, 2018, for U.S. Appl. No. 13/340,970, dated May 3, 2018, 18 pages.
Supplemental response to Final Office Action filed on Aug. 2, 2016 for U.S. Appl. No. 13/340,970, dated Apr. 4, 2016, 16 pages.
Geekery, "Proposal for Free, Open Source Cell Phone Location Service", Retrieved from the Internet: URL<//crud.blog/2004/03/06/proposal-for-free-open-source-cell-phone-location-service/>, Mar. 6, 2004, 8 pages.

* cited by examiner

SYSTEMS AND METHODS FOR DELIVERING DYNAMIC OFFERS TO INCENT USER BEHAVIOR

CROSS-REFERENCE TO RELATED APPLICATIONS

This application is a continuation of U.S. application Ser. No. 13/340,970 filed Dec. 12, 2011, and entitled "Systems And Methods For Delivering Dynamic Offers To Incent User Behavior," which is hereby incorporated herein in its entirety by reference.

TECHNICAL FIELD

This application relates generally to data processing within a network-based system operating over a distributed network, and more specifically to systems and methods for delivering dynamic offers or coupons to incent user behavior.

BACKGROUND

The ever increasing use of smart phones, such as the iPhone® (from Apple, Inc. of Cupertino Calif.), with data connections and location determination capabilities is slowly changing the way people shop for products and services. Smart phones can provide users with nearly instant information for price comparison purposes. For example, applications such as RedLaser™ (from eBay, Inc. of San Jose, Calif.) allow a smart phone user to scan a bar code and instantly check prices across online and local retail outlets. Smart phones also commonly include mechanisms, such as global positioning satellite (GPS) receivers, that allow the devices to constantly update location information. These technology changes are also driving changes in the way merchants attract consumers.

BRIEF DESCRIPTION OF THE DRAWINGS

Some embodiments are illustrated by way of example and not limitation in the figures of the accompanying drawings in which.

DEFINITIONS

Figure 1:
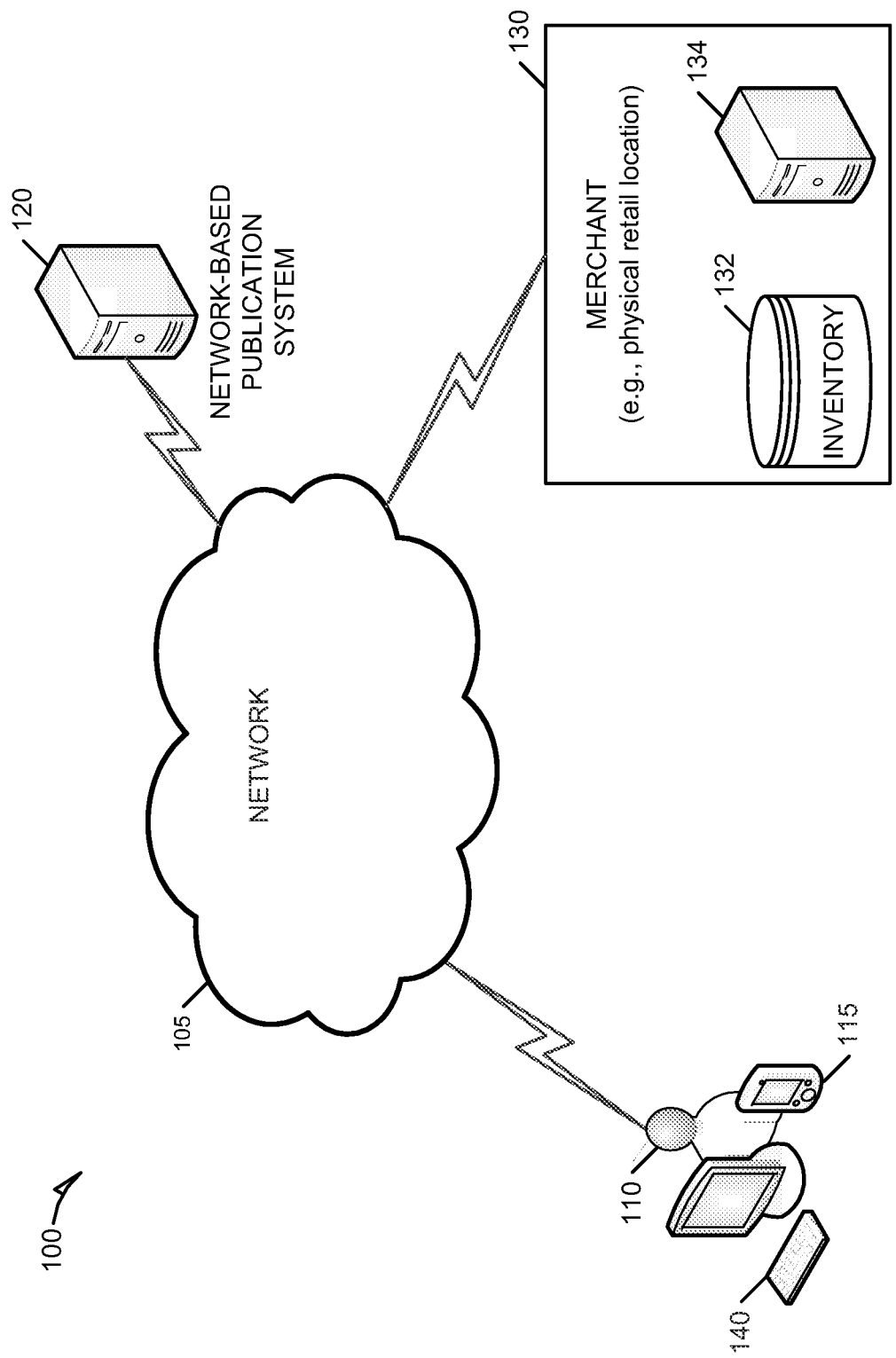
FIG. 1 is a block diagram depicting a system for delivering dynamic context driven offers to incent user behavior, according to an example embodiment.

Location—For the purposes of this specification and the associated claims, the term "location" is used to refer to a geographic location, such as a longitude/latitude combination or a street address. The term location is also used within this specification in reference to a physical location associated with a retail outlet (e.g., store).

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Context—For the purposes of this specification and the associated claims, the term "context" is used to refer to environmental inputs, such as location, time, and weather conditions, among others. The context generally refers to conditions describing an individual's (e.g., user's) environment and/or activities. For example, context information can include a user's location, direction of movement, current activity (e.g., working, driving, playing golf, shopping, etc.), current weather conditions, time of day, and time of year (e.g., season), among other things. In certain examples, context information about a user can also include past events, purchase history, or other historical data about the user.

DETAILED DESCRIPTION

Example systems and methods for delivering dynamic context sensitive offers to incent user behavior are described. In some example embodiments, the systems and methods for delivering dynamic context sensitive offers may provide merchants the ability to target customers based on the current context (e.g., location) and past behavior of a user registered with a network-based publication system. In the following description, for purposes of explanation, numerous specific details are set forth in order to provide a thorough understanding of example embodiments. It will be evident, however, to one skilled in the art, that the present invention may be practiced without these specific details. It will also be evident that a real-time dynamic context sensitive offer publication system is not limited to the examples provided and may include other scenarios not specifically discussed.

In accordance with an example embodiment, a network-based system can provide a platform to deliver dynamic context sensitive offers to incent user behavior. In certain examples, the dynamic nature of the offers can be utilized to incent user behavior (e.g., to encourage the user to act on the offer). For example, if a merchant wants to target users at varying distances from a retail location, offers sent to users at a greater distance can include a bigger incentive (e.g., discount). Additionally, all dynamic offers can include an automatic incrementally decreasing value feature to incent the recipient to redeem the offer sooner rather than later. Further, the dynamic context sensitive offer can include rules that slow, halt, or even reverse the decrease in value based on actions taken by the user. For example, if the user is detected moving towards a retail location, the decrease in value can be slowed or halted. If the user shares the offer with friends (via a social network or email), the value can be increased or manipulated in some positive manner.

In some examples, the user receives dynamic offers from a network-based system via a mobile device, such as a smartphone, a tablet computing device, or an Internet enabled personal digital assistant (PDA), among others. In an example, the network-based system can include a publication module capable of delivering dynamic context sensitive offers to a user based on stored user profile data and local merchant inventory as well as other context information. In an example, the user's mobile device can periodically transmit user information updates to the network-based publication system, allowing the network-based publication system to re-calculate the dynamic context sensitive offer. For example, a user can be sent a dynamic context sensitive offer that automatically incrementally decreases in value over time. The dynamically decreasing value may be stopped or reversed based on certain actions taken by the user. In an example, the dynamic decrease in value can be slowed by receiving location data that indicates the user is moving towards a related retail location.

Example System

FIG. 1 is a block diagram depicting a system 100 for delivering dynamic context sensitive offers, according to an example embodiment. The system 100 can include a user 110, a network-based publication system 120, and a merchant 130. In an example, the user 110 can connect to the network-based publication system 120 via a mobile device 115 (e.g., smart phone, PDA, laptop, or similar mobile electronic device capable of some form of data connectivity). In an example, the network-based publication system 120 tracks dynamic offers, including the changing value, over time until an offer expires or is redeemed (e.g., offer lifetime). In certain examples, the network-based publication system 120 can communicate a dynamic offer to a computing device 140 associated with the user 110. In this example, the user 110 may use a printer associated with the computing device 140 to print the dynamic context sensitive offer. In this example, the printed version of the dynamic offer may include some written indication of the dynamic nature of the value associated with the offer. The paper version of the dynamic offer can also include some form of scannable code (e.g., bar code, QR code, etc.) that allows a merchant, such as merchant 130, to redeem the dynamic offer and apply the value at time of redemption to the user's purchase. In the printed offer example, the merchant's point of sale (POS) system, such as POS system 134, can communicate with the network-based publication system 120 to determine the value of the dynamic offer at time of redemption.

In an example, the merchant 130 can operate computer systems, such as an inventory system 132 or a POS system 134. The network-based publication system 120 can interact with any of the systems used by merchant 130 for operation of the merchant's retail or service business. In an example, the network-based publication system 120 can work with both POS system 134 and inventory system 132 to obtain access to inventory available at individual retail locations run by the merchant and match merchandise on which the merchant wants to offer deals with context information extracted from user profile data associated with user 110 or received from a mobile device 115 associated with the user 110. Additionally, the network-based publication system 120 can interact with the POS system 134 to redeem dynamic offers during the purchase process. For example, the merchant 130 can create rule-based instructions for use by the network-based publication system 120 in generating offers based on available inventory or to drive business during slow periods of the day, week, month, or year. In certain examples, the merchant 130 can maintain the rule-based instructions within a locally operated POS system 134 that can communicate with the network-based publication system 120 over the network 105. In another example, the merchant 130 can access the network-based publication system 120 via a web interface to create rule-based instructions for use in generating offers and controlling offers over the lifetime of the offer. In an example, each dynamic offer generated by the network-based publication system 120 can include an expiration date limiting the useful lifetime of the offer.

In general, offers can be generated by the network-based publication system 120 based on any explicit or implicit indication of interest by a user. For example, a user may run an application on mobile device 115 that explicitly requests offers to display to the user based on user input. In another example, the same application running on mobile device 115 may regularly exchange data with the network-based publication system 120, which can implicitly trigger dynamic offers to be generated and delivered to the mobile device 115. Publication or electronic commerce platforms can capture information about a user ranging from location data to activity data to Internet browsing patterns (e.g., context information). Many different pieces of context information can be derived from this wealth of information. For example, a merchant may wish to target individuals within a defined proximity to a retail location for dynamic offers. Alternatively, a merchant may wish to target users with a certain historical profile of visiting similar establishments for a dynamic offer. Additionally, if a user spends a great deal of time browsing informational pages related to a particular product or service, an online system, such as the network-based publication system 120, can infer that the user has an interest in purchasing that particular product or service.

Example Operating Environment

Figure 2:
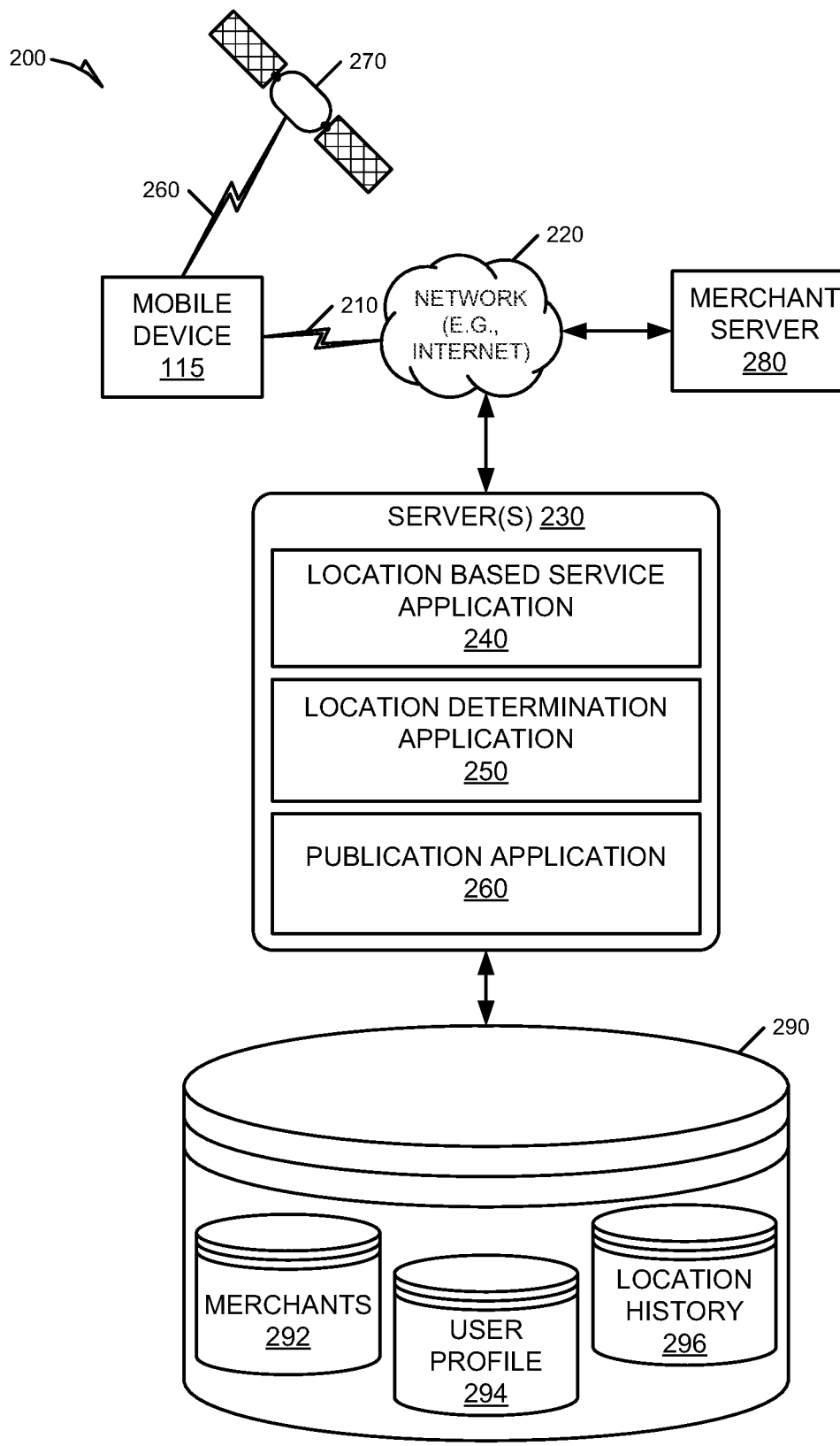
FIG. 2 is a block diagram illustrating an environment for operating a mobile device, according to an example embodiment.

FIG. 2 is a block diagram illustrating an environment 200 for operating a mobile device 115, according to an example embodiment. The environment 200 is an example environment within which methods of delivering dynamic context sensitive offers to incent user behavior can be operated. The environment 200 can include a mobile device 115, a communication connection 210, a network 220, servers 230, a communication satellite 270, a merchant server 280, and a database 290. The servers 230 can optionally include location based service application 240, location determination application 250, and publication application 260. The database 290 can optionally include merchant databases 292, user profile database 294, and/or location history database 296. The mobile device 115 represents one example device that can be utilized by a user to receive offers and share context information associated with the user. The mobile device 115 may be any of a variety of types of devices (for example, a cellular telephone, a PDA, a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers 230 may execute location based service (LBS) applications 240, which interoperate with software executing on the mobile device 115, to provide LBSs to a user. LBSs can use knowledge of the device's location, and/or the location of other devices, to provide location-specific information, recommendations, notifications, interactive capabilities, and/or other functionality to a user. For example, an LBS application 240 can provide location data to a network-based publication system 120, which can then be used to assist in generating offers (e.g., dynamic context sensitive offers) relevant to the user's current location. Knowledge of the device's location, and/or the location of other devices, may be obtained through interoperation of the mobile device 115 with a location determination application 250 executing on one or more of the servers 230. Location information may also be provided by the mobile device 115, without use of a location determination application, such as application 250. In certain examples, the mobile device 115 may have some limited location determination capabilities that are augmented by the location determination application 250. In some examples, the servers 230 can also include publication application 260 for providing location-aware offers that may be triggered by past missed purchase opportunities. In certain examples, location data can be provided to the publication application 260 by the location determination application 250. In some examples, the location data provided by the location determination application 250 can include merchant information (e.g., identification of a retail location). In certain examples, the location determination application 250 can receive signals via the network 220 to further identify a location. For example, a merchant may broadcast a specific IEEE 802.11 service set identifier (SSID) that can be interpreted by the location determination application 250 to identify a particular retail location. In another example, the merchant may broadcast an identification signal via radio-frequency identification (RFD), near-field communication (NFC), or a similar protocol that can be used by the location determination application 250.

Example Mobile Device

Figure 3:
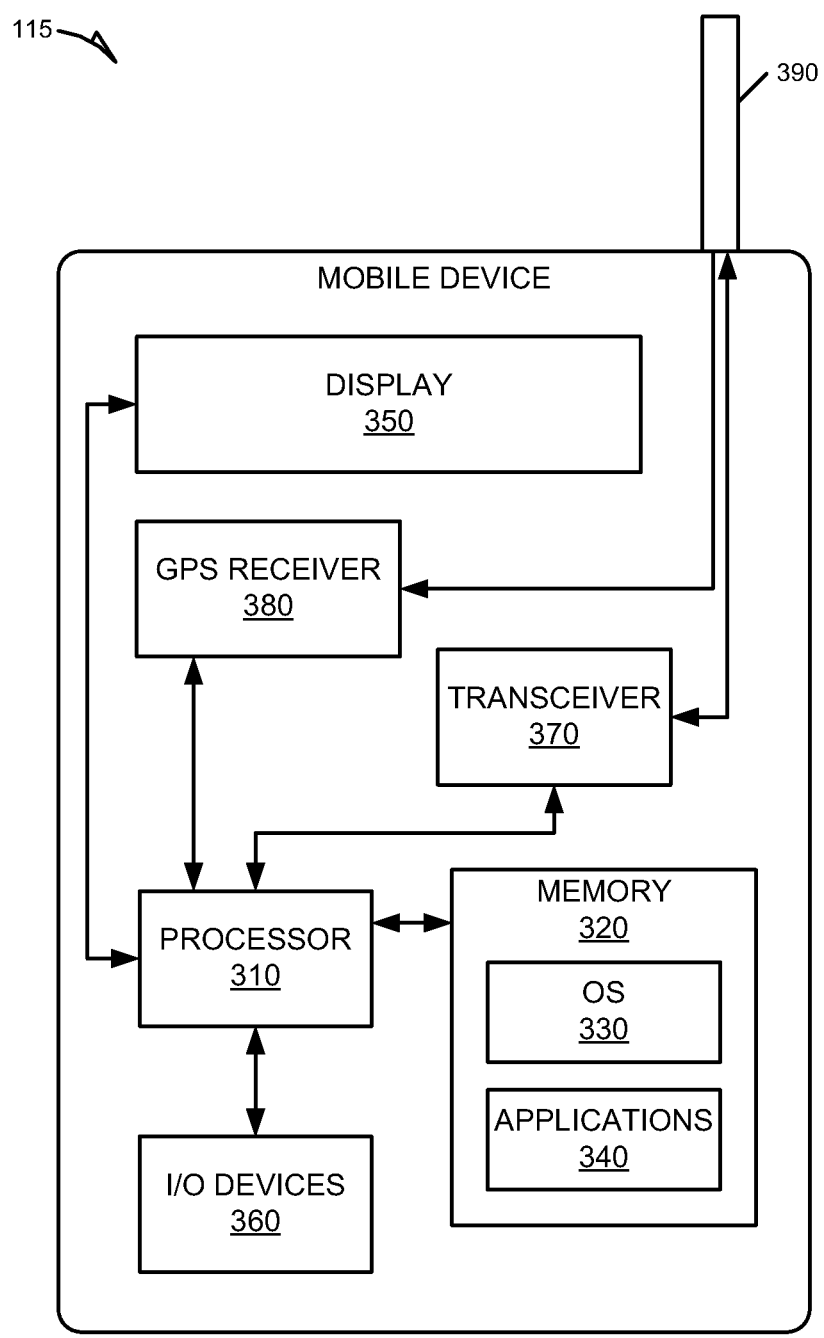
FIG. 3 is a block diagram illustrating a mobile device, according to an example embodiment.

FIG. 3 is a block diagram illustrating the mobile device 115, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random. Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Additional detail regarding providing and receiving location-based services can be found in U.S. Pat. No. 7,848,765, titled "Location-Based Services," granted to Phillips et al. and assigned to Where, Inc. of Boston, Mass., which is hereby incorporated by reference.

An example geo-location concept discussed within U.S. Pat. No. 7,848,765 is a geofence. A geofence can be defined as a perimeter or boundary around a physical location or mobile object (e.g., a user). A geofence can be as simple as a radius around a physical location defining a circular region around the location. However, a geofence can be any geometric shape or an arbitrary boundary drawn on a map. A geofence can be used to determine a geographical area of interest for the calculation of demographics, advertising, or similar purposes. Geofences can be used in conjunction with the offer generation and delivery concepts discussed herein. For example, a geofence can be used to assist in determining whether a user (or mobile device associated with the user) is within a geographic area of interest to a particular merchant. If the user is within a geofence established by the merchant, the systems discussed herein can use that information to generate an offer from the merchant and deliver the offer to the user (e.g., via a mobile device associated with the user).

Example Platform Architecture

Figure 4:
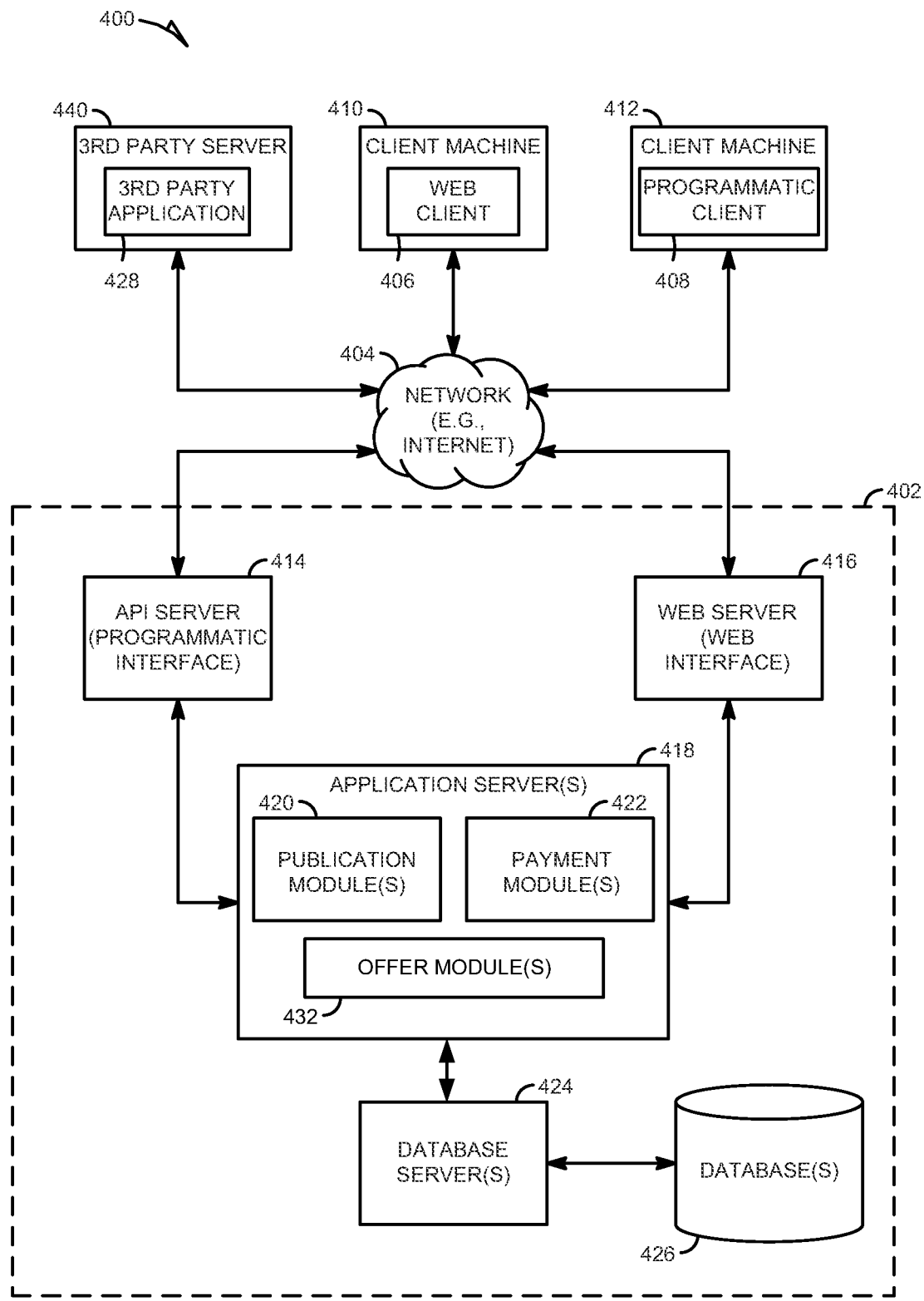
FIG. 4 is a block diagram illustrating a network-based system for delivering dynamic, context-sensitive offers to incent user behavior, according to an example embodiment.

FIG. 4 is a block diagram illustrating a network-based system 400 for providing dynamic context sensitive offers to incent user behavior, according to an example embodiment. The block diagram depicts a network-based system. 400 (in the exemplary form of a client-server system), within which an example embodiment can be deployed. A networked system 402 is shown, in the example form of a network-based location-aware publication, advertisement, or marketplace system, that provides server-side functionality, via a network 404 (e.g., the Internet or WAN) to one or more client machines 410, 412. FIG. 4 illustrates, for example, a web client 406 (e.g., a browser, such as the Internet Explorer browser developed by Microsoft Corporation of Redmond, Wash.) and a programmatic client 408 (e.g., WHERE smartphone application from Where, Inc. of Boston, Mass.) executing on respective client machines 410 and 412. In an example, the client machines 410 and 412 can be in the form of a mobile device, such as mobile device 115.

An Application Programming Interface (API) server 414 and a web server 416 are coupled to, and provide programmatic and web interfaces respectively to, one or more application servers 418. The application servers 418 host one or more publication modules 420 (in certain examples, these can also include commerce modules, advertising modules, and marketplace modules, to name a few), payment modules 422, and dynamic offer modules 432. The application servers 418 are, in turn, shown to be coupled to one or more database servers 424 that facilitate access to one or more databases 426. In some examples, the application server 418 can access the databases 426 directly without the need for a database server 424.

The publication modules 420 may provide a number of publication functions and services to users that access the networked system 402. The payment modules 422 may likewise provide a number of payment services and functions to users. The payment modules 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 may also be configured to present or facilitate a redemption of offers, generated by the location-aware over modules 432, to a user during checkout (or prior to checkout, while the user is still actively shopping). The offer modules 432 may provide dynamic context sensitive offers (e.g., coupons or immediate discount deals on targeted products or services) to users of the networked system 402. The offer modules 432 can be configured to use all of the various communication mechanisms provided by the networked system 402 to present offer options to users. The offer options can be personalized based on current location, time of day, user profile data, past purchase history, or recent physical or online behaviors recorded by the network-based system 400, among other things (e.g., context information). While the publication modules 420, payment modules 422, and offer modules 432 are shown in FIG. 4 to all form part of the networked system 402, it will be appreciated that, in alternative embodiments, the payment modules 422 may form part of a payment service that is separate and distinct from the networked system 402. Additionally, in some examples, the offer modules 432 may be part of the payment service or may form an offer generation service separate and distinct from the networked system 402.

Further, while the system 400 shown in FIG. 4 employs a client-server architecture, the present invention is of course not limited to such an architecture, and could equally well find application in a distributed, or peer-to-peer, architecture system, for example. The various publication modules 420, payment modules 422, and over modules 432 could also be implemented as standalone systems or software programs, which do not necessarily have networking capabilities.

The web client 406 accesses the various publication modules 420, payment modules 422, and offer modules 432 via the web interface supported by the web server 416. Similarly, the programmatic client 408 accesses the various services and functions provided by the publication modules 420, payment modules 422, and offer modules 432 via the programmatic interface provided by the API server 414. The programmatic client 408 may, for example, be a smartphone application (e.g., the WHERE application developed by Where, Inc., of Boston, Mass.) that enables users to receive dynamic context sensitive offers on their smartphones leveraging user profile data and current location information provided by the smartphone or accessed over the network 404.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the offer modules 432 for configuration purposes. In certain examples, merchants can use programmatic interfaces provided by the API server 414 to develop and implement rules-based pricing schemes that can be implemented via the publication modules 420, payment modules 422, and offer modules 432.

Example Offer Modules

Figure 5:
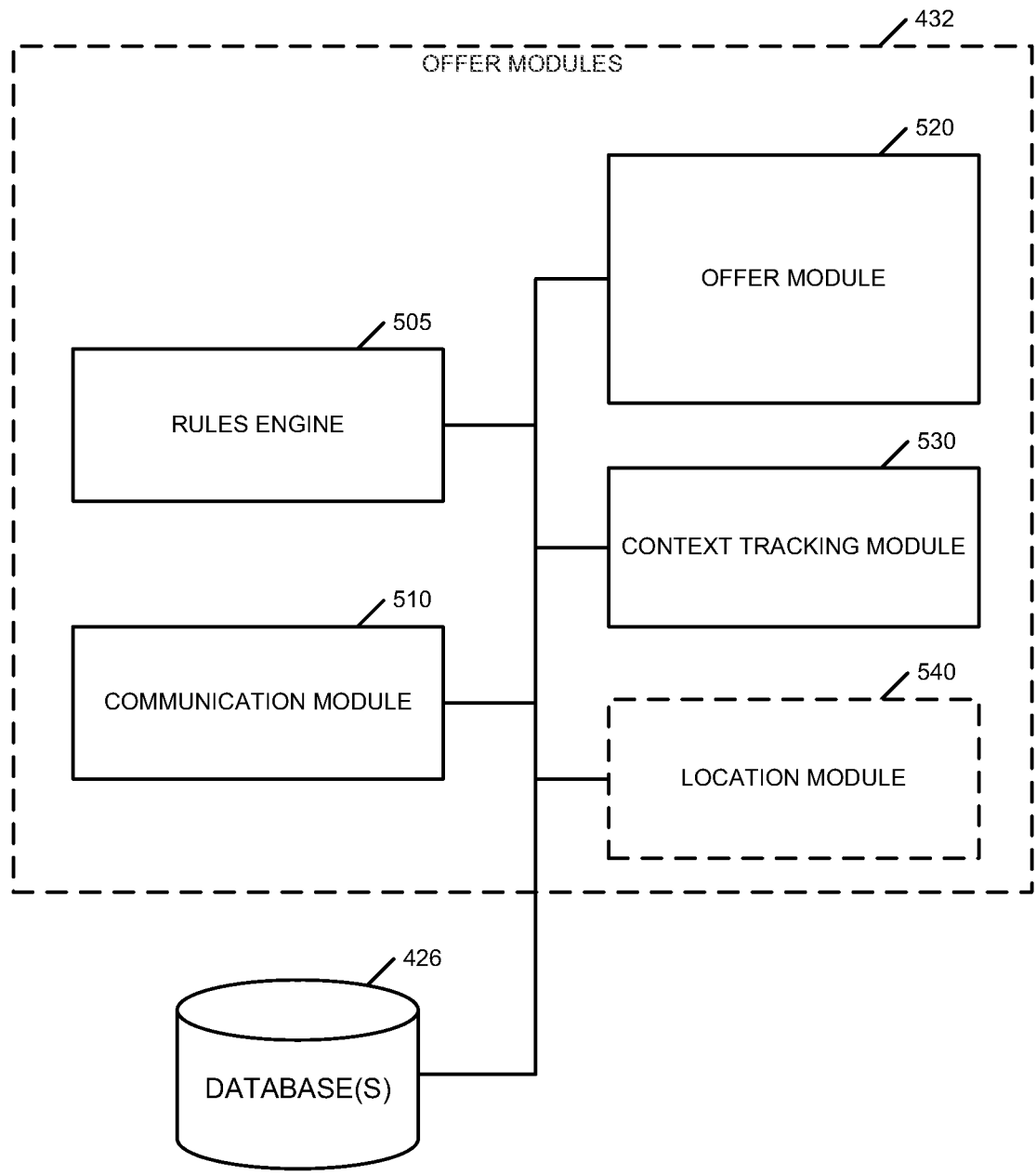
FIG. 5 is a block diagram illustrating offer modules, according to an example embodiment.

FIG. 5 is a block diagram illustrating dynamic context sensitive offer modules 432, according to an example embodiment. In this example, the offer modules 432 can include a rules engine 505, a communication module 510, an offer module 520, and a context tracking module 530. Optionally, the offer modules 432 can also include a location module 540. In an example, the offer modules 432 can access database 426 to store and/or retrieve offer rules, user profile date, and location data, as well as other information, to enable dynamic context sensitive offers to be generated, delivered, tracked, redeemed, and expired.

In an example, the rules engine 505 can be configured to manage and evaluate rules controlling the dynamic nature of the dynamic context sensitive offers. As discussed above, the dynamic context sensitive offers can include a value that incrementally decreases over time and the value can also be manipulated by rules for slowing, halting, or reversing the decrease in value. The rules engine 505 can work in conjunction with a database, such as database 426, to manage rules used to manipulate the value of the dynamic offers. Each value manipulation rule (also referred to simply as a "rule") can use context information as inputs. In an example, merchants, such as merchant 130, can create rules for dynamically manipulating value and communicate them to the rules engine 505 for storage, management, and real-time evaluation. In an example system, the rules engine 505 communicates directly with the communication module 510, the offer module 520, and the context tracking module 530.

In certain examples, the rules engine 505 can also communicate directly with the location module 540 and the database 426.

In an example, the communication module 510 can be configured to manage communications between the offer modules 432 and a user, where the user is communicating via the mobile device 115 or the computing device 140. The communication module 510 can also be configured to manage communications between the offer modules 432 and a merchant, such as merchant 130 communicating via the inventory system 132 or POS system 134.

In an example, the offer module 520 can be configured to generate dynamic context sensitive offers and manage the offers throughout the lifetime of each offer. The offer module 520 can work in conjunction with the rules engine 505 to evaluate and re-evaluate the value of the dynamic offers. In an example, the value of each dynamic offer is continuously (or periodically at certain set time intervals, such as hourly) updated according to rules associated with the offer and managed by the rules engine 505. For example, a simple dynamic context sensitive offer may have an associated rule that incrementally decreases the value of the offer by 5% every 4 hours until the offer hits a minimum value. In another example, a dynamic context sensitive offer can have an additional rule that slows the decrease in value to 5% every 12 hours if the user has shared the offer with at least one friend (e.g., via email or on a social network platform, such as FACEBOOK (from Facebook, Inc. of Palo Alto Calif.)).

The offer module 520 can track each individual dynamic offer throughout the offer's lifetime (for example, generation through redemption or expiration). In certain examples, the dynamic context sensitive offers can be delivered in print form or in print-ready electronic form. In these examples, the offer module 520 can communicate with a redeeming merchant, such as merchant 130, to determine the actual value of the coupon at redemption. Determining the value at redemption can involve the rules engine 505 re-evaluating value manipulation rules based on context inputs from the context tracking module 530, and in some cases, the location module 540. Whenever dynamic offers are delivered by the offer module 520 in print or print-ready format, the offer can include a minimum and maximum value indication to give the user some idea regarding potential value.

In an example, the context tracking module 530 can be configured to track information provided by a user pertaining to context, such as location, activity, or environment. The context tracking module 530 can receive data via the communication module 510. In certain examples, the context tracking module 530 can also communicate with external data sources associated with a user to obtain additional context information. For example, a user can provide access credentials for a social network, such as FACEBOOK, from which the context tracking module 530 can extract information related to the user.

In an example, the location module 540 is configured to receive location data from a mobile device, such as mobile device 115, and determine from the location data one or more participating merchant locations that are within a predefined proximity. In some examples, the location module 540 can receive GPS-type coordinates (e.g., longitude and latitude), which can be used to establish a current location associated with a mobile device (and, thus, a user of the mobile device). Using the longitude and latitude coordinates, the location module 540 can determine if any merchants with physical locations registered with the networked system 402 are in proximity to the current location associated with the user. In certain examples, the location module 540 can receive other location determining information from a mobile device. For example, some merchants may broadcast specific wireless network signals that can be received by a mobile device, such as mobile device 115. Once received, the mobile device 115 can include programming or circuitry to translate the signal into a specific location, or the mobile device 115 can simply retransmit the unique signal to the location module 540. In an example, a merchant location can transmit a unique SSID, which the location module can be programmed to interpret as identifying a specific merchant location. In another example, the merchant may broadcast a unique SSID within all of its locations and the location module 540 can be programmed to use a combination of the unique SSID and other location data (e.g., GPS coordinates or cell tower locations) to identify a specific location.

Figure 6:
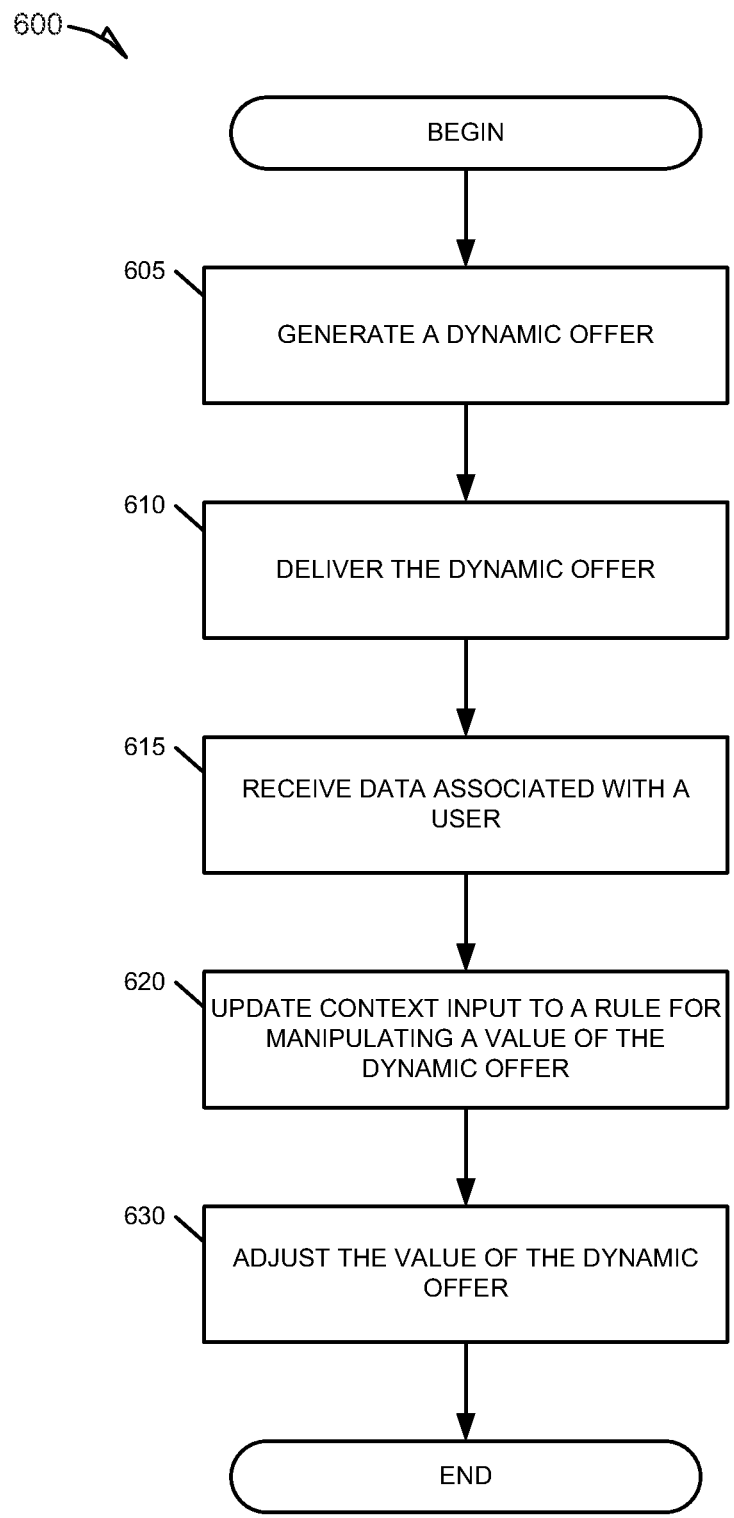
FIG. 6 is a flowchart illustrating a method for delivering dynamic context sensitive offers to incent user behavior, according to an example embodiment.
Figure 7:
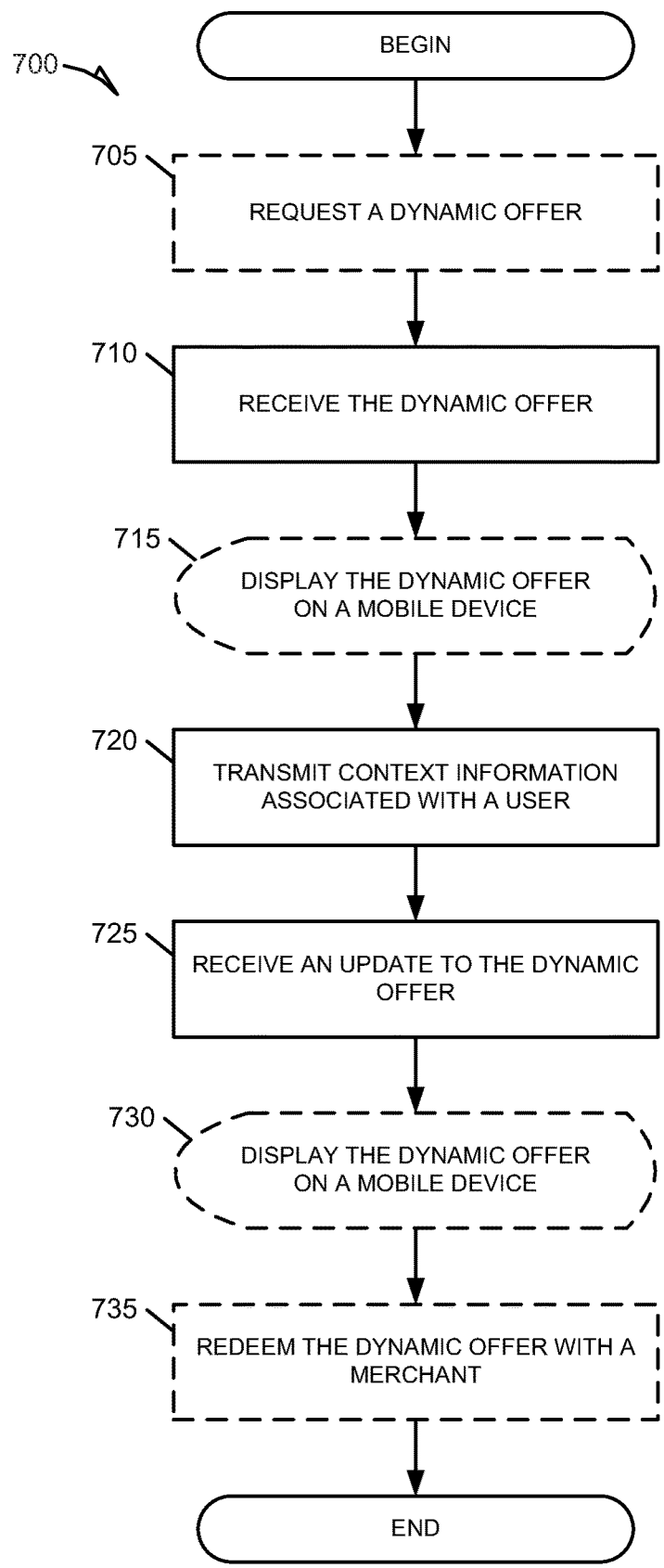
FIG. 7 is a flowchart illustrating a method for receiving dynamic context sensitive offers, according to an example embodiment.
Figure 8:
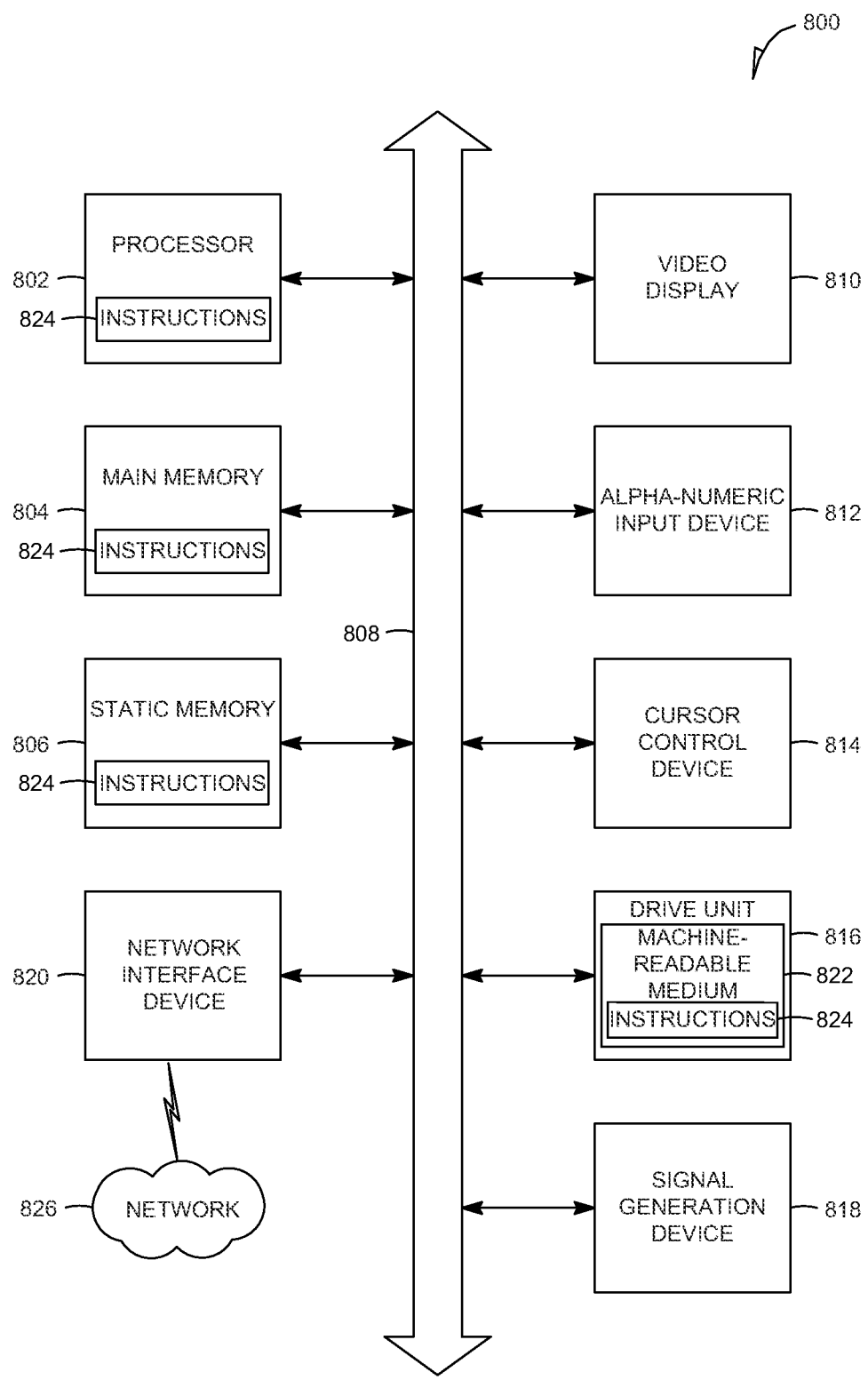
FIG. 8 is a diagrammatic representation of a machine in the example form of a computer system within which a set of instructions for causing the machine to perform any one or more of the methodologies discussed herein may be executed.

Additional details regarding the functionality provided by the location-aware offer modules 432 are detailed in reference to FIGS. 6-8.

Example Methods

FIG. 6 is a flowchart illustrating a method 600 for delivering dynamic context sensitive offers to incent user behavior, according to an example embodiment. In an example, the method 600 can include operations such as: generating a dynamic offer at 605, delivering the dynamic offer at 610, receiving data associated with a user at 615, updating a context input at 620, and adjusting the value of the dynamic offer at 630. In this example, the method 600 can begin at 605 with the offer module 520 generating a dynamic offer. The dynamic offer generation can include receiving initial attribute data from a user. In an example, initial attribute data can be used by the rules engine 505 to create an initial value for the dynamic offer.

At 610, the method 600 can continue with the communication module 510 delivering the dynamic offer to a user, such as user 110. The dynamic offer can be delivered electronically to mobile devices, such as mobile device 115, or can be delivered in a print or print ready format. At 615, method 600 can continue with the context tracking module 530 receiving data associated with the user from the communication module 510. In certain examples, the context tracking module 530 can receive contact information directly from the user, such as from the mobile device 115. In certain examples, the context tracking module 530 can aggregate data associated with a user from multiple sources. At 620, the method 600 can continue with the rules engine 505 updating the context input to a rule for manipulating a value of the dynamic offer. In an example, the rules engine 505 can obtain the context input from the context tracking module 530. Once the context input is updated, the rules engine 505 can re-evaluate the value manipulation rule (or rules, if more than one rule is associated with the dynamic offer) to alter the value associated with the dynamic offer. At 630, the method 600 can conclude with the offer module 520 adjusting the value of the dynamic offer as dictated by the reevaluation of the rule manipulating the value of the dynamic offer performed by the rules engine 505.

In an example, operation 605 within the method 600 can include a number of optional operations. For example, generating the dynamic offer can include evaluating one or more initial value rules. The initial value rules can utilize context information received from a user. In operation 605, the offer module 520 can associate one or more value manipulation rules that can be evaluated continuously throughout the lifetime of the offer by the rules engine 505. Value manipulation rules can include rules such as: a rule that incrementally decreases the value of the offer over time; a rule that slows, halts, or reverses an incremental decrease in value; a rule that increases or decreases the value based on current weather conditions; a rule that modifies the incremental decrease in value based on a user's location; or a rule that increases the value of the offer based on the user sharing the offer with other users, among others.

In an example, a user can share a dynamic offer via a social network, such as TWITTER (from Twitter, Inc. of San Francisco, Calif.), or via e-mailing it to a friend. Dynamic offers received electronically can easily be shared via a post to FACEBOOK or TWITTER. In addition to sharing, rules for manipulating the value of a dynamic context-sensitive coupon can also be based on context data derived from external sources. For example, the rules engine 505 can obtain check-in data from a service such as FOURSQUARE (from Foursquare, Inc. of New York, N.Y.). In this example, a value manipulation rule can base a value increase or decrease on the number of times a user has checked in at a particular location. Using frequency of visit data, such as check-in data from FOURSQUARE, merchants can utilize dynamic context-sensitive offers to reward loyalty program members or other frequent visitors. In certain examples, the network-based publication system 120 can track loyalty information for a merchant, such as merchant 130.

In an example, the value manipulation rules used within method 600 can also include rules based on time of day. Merchants, such as merchant 130, can use time of day based rules to drive traffic during slow portions of the day, week, or month. For example, the offer module 520 can generate a dynamic context sensitive offer that includes a rule that increases the value of the offer by 10% between the hours of 2 PM and 5 PM.

FIG. 7 is a flowchart illustrating a method 700 for receiving dynamic context sensitive offers to intent user behavior, according to an example embodiment. In an example, the method 700 can include operations such as: receiving a dynamic offer at 710, transmitting context information associated with the user 720, and receiving an update to the dynamic offer at 725. Optionally, the method 700 can also include operations such as: requesting a dynamic offer at 705, displaying the dynamic offer on a mobile device at 715, displaying the updated dynamic offer at 730, and redeeming the dynamic offer with a merchant at 735. In this example, the method 700 includes operations that can be performed on a client device, such as client machine 412 or mobile device 115.

Optionally, at 705, the method 700 can begin with the mobile device 115 requesting a dynamic offer. In an example, the mobile device 115 can transmit a request for a dynamic offer to the network-based publication system 120. At 710, the method 700 can continue with the mobile device 115 receiving the dynamic offer. In an example, the dynamic offer is received by an application running on the mobile device 115. In this example, the dynamic offer can be transmitted as an XML (extensible mark-up language) document or other suitable machine-readable format. In another example, the dynamic offer is received on the client machine 412 as an electronic file, such as a file in portable document format (PDF) or similar electronic file format suitable for future printing.

At 715, the method 700 can optionally continue with the mobile device 115 displaying the dynamic offer to a user. At 720, the method 700 can continue with the mobile device 115 transmitting context information associated with the user to the network-based publication system 120. In certain examples, the operation at 720 can also include the mobile device 115 collecting context data associated with the user from the surrounding environment, such as location or weather related data.

At 725, the method 700 can continue with the mobile device 115 receiving an update to the dynamic offer from the network-based publication system 120. In an example, the update to the dynamic offer can include a manipulation of the value based on rules evaluated within the network-based publication system 120, such as within the rules engine 505. At 730, the method 700 can optionally conclude with the mobile device 115 displaying the updated dynamic offer to a user.

Finally, the method 700 can optionally include an operation 735. At operation 735, the method 700 can conclude with the user, such as user 110, redeeming the dynamic offer with a merchant, such as merchant 130. In an example, the user can electronically redeem the dynamic offer by presenting a scannable code included in the dynamic offer at the merchant's POS system, such as POS system 134. In some examples, the user can use the mobile device 115 to redeem the dynamic offer at a merchant location. Redeeming a dynamic offer via the mobile device 115 can involve transmitting the dynamic offer to the POS system 134 via some form of wireless networking, such as near field communication (NFC), Bluetooth, or IEEE 802.11 (WiF1). In another example, the mobile device 115 can display a scannable code to the POS system 134 to redeem the dynamic offer. In yet another example, the mobile device 115 can transmit a redemption indication to the network-based publication system 120, and the network-based publication system 120 can communicate with the POS system 134 to enable the user to receive the discount.

Regardless of the mechanism used to redeem the dynamic offer, redemption can include the network-based publication system 120 evaluating the final value associated with the dynamic offer based on context information associated with the user. The final value of the dynamic offer can be transmitted to either the user 110, the merchant 130, or both.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

FIG. 8 is a block diagram of a machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (SIB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control (user interface (U1) navigation) device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or used by any one or more of the methodologies or functions described herein. The instructions 824 may also reside, completely or at least partially, within the main memory 804, static memory 806, and/or within the processor 802 during execution thereof by the computer system 800, with the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computerized system comprising:
   one or more processors; and
   one or more computer storage media storing computer-usable instructions that, when used by the one or more processors, cause the one or more processors to:
   generate a dynamic offer that includes: an initially-calculated offer value, a predefined minimum value of the initially-calculated offer value, a predefined maximum value of the initially-calculated offer value, and a predefined location to redeem the generated dynamic offer, wherein the dynamic offer is transmitted, at a first time, to a first user device associated with a first user, and wherein the predefined minimum value indicates, at the first user device, a potential minimum value that the initially-calculated offer can change to, and wherein the initially-calculated offer is greater than the predefined minimum value;
   modify the initially-calculated offer value based at least in part on movement of the first user device relative to the predefined location where the dynamic offer is redeemable, wherein the modification changes the initially-calculated offer-value to a modified value greater than the predefined minimum value; and
   based at least in part on the modification, transmit, to the first user device, the modified value at a second time subsequent to the first time.

2. The system of claim 1, wherein the incrementally decrease or increase includes increasing a sales price of an item or decreasing the sales price of the item, and wherein the modifying the particular offer value includes changing the sales price of the item.

3. The system of claim 1, wherein the incrementally decreasing or increasing the initially-calculated offer value includes decreasing or increasing a coupon discount value of an item, and wherein the modification changes the coupon discount value to another coupon discount value.

4. The system of claim 1, wherein the movement includes the first user device moving toward the predefined location.

5. The system of claim 1, wherein the movement include the first user device moving away from the predefined location or the movement includes the first user device not getting closer to the predefined location.

6. The system of claim 1, wherein the modifying of the particular offer value includes increasing a sales price of an item based on the first user device not getting closer to the predefined location.

7. The system of claim 1, wherein the modifying of the particular offer value is further based on receiving an indication that the first user device has transmitted a second offer value to a second user device associated with a friend of acquainted with the first user.

8. The system of claim 1, wherein the incrementally decrease or increase of the initially-calculated offer value includes decreasing or increasing a discount percentage for every particular time interval that passes, and wherein the modifying of the particular offer value includes modifying the discount percentage while maintaining the particular time interval that passes.

9. The system of claim 1, wherein the modifying of the particular offer value includes slowing, halting, or reversing a coupon discount value based on the first user device moving further away from the predefined location.

10. A computer-implemented method comprising:
    generating a dynamic offer that includes: an initially-calculated offer value, a predefined minimum value of the initially-calculated offer value, a predefined maximum value of the initially-calculated offer value, and a predefined location to redeem the generated dynamic offer, wherein the initially-calculated offer value is transmitted, at a first time, to a first user device associated with a first user;
    incrementally decreasing or increasing the initially-calculated offer value by changing the initially-calculated offer value by a first value every first time interval;
    subsequent to the incrementally decreasing or increasing, modifying the first time interval to a second time interval such that the decreasing or increasing is slowed down or sped up according to the modifying, the modifying of the first time interval being based at least in part on movement of the first user device relative to the predefined location where the dynamic offer is redeemable; and
    based at least in part on the modifying of the first time interval, transmit, to the first user device, another offer value at a second time after the first time.

11. The method of claim 10, wherein the incrementally decreasing or increasing includes increasing a sales price of an item after a first time or decreasing the sales price of the item after the first time, and wherein the modifying includes modifying the sales price of the item after a second time.

12. The method of claim 10, wherein the incrementally decreasing or increasing the initially-calculated offer value includes decreasing coupon discount percentage of an item, and wherein the modification changes the coupon discount percentage to another percentage per the first time interval.

13. The method of claim 10, wherein the incrementally decreasing or increasing the initially-calculated offer includes increasing the first time interval to a second interval even though the first value remains unchanged.

14. The method of claim 10, wherein the movement includes the first user device moving away from the predefined location, and wherein the modification includes decreasing a sales price of an item based on the first user device moving away from the predefined location.

15. The method of claim 10, wherein the movement includes the first user device being stationary relative to the predefined location.

16. The method of claim 10, wherein the modifying of the first value includes changing a rate at which the first value decreases or increases.

17. The method of claim 10, wherein the modifying of the first value is further based on receiving an indication that the first user device has transmitted a second offer value to a second user device associated with a friend or acquaintance of the first user.

18. The method of claim 10, further comprising reversing the incrementally decreasing or increasing the initially-calculated offer value by changing the first value back to the initially-calculated offer value based at least in part on additional movement of the first user device.

19. A non-transitory machine-readable storage medium including instructions which, when executed on a machine, cause the machine to perform operations comprising:
  generating a dynamic offer that includes an initially-calculated offer value, a predefined minimum value of the initially-calculated offer value, a predefined maximum value of the initially-calculated offer value, and a predefined location to redeem the generated dynamic offer, wherein the dynamic offer is communicated to a first user device associated with a first user, and wherein the predefined minimum value indicates, at the first user device, a potential minimum value that the initially-calculated offer can change to, and wherein the initially-calculated offer is greater than the predefined minimum value;
  incrementally decreasing or increasing the initially-calculated offer value to a particular offer value;
  modifying the particular offer value based at least in part on movement data of the first user device relative to the predefined location where the dynamic offer is redeemable; and
  based at least in part on the modification, transmitting, to the first user device, the modified value.

20. The non-transitory machine-readable storage medium of claim 19, wherein the modification includes stopping a decrease of the particular offer value such that the particular offer value remains unchanged for a particular time period.

* * * * *